Nov. 28, 1939. W. J. POLYDOROFF Re. 21,281

SELECTIVE RADIO CIRCUIT

Original Filed Aug. 26, 1929

INVENTOR
WLADIMIR J. POLYDOROFF
BY
Pennie, Davis, Marvin & Edmonds
ATTORNEYS

Reissued Nov. 28, 1939 Re. 21,281

UNITED STATES PATENT OFFICE 21,281

SELECTIVE RADIO CIRCUIT

Wladimir J. Polydoroff, Wilmette, Ill., assignor to Johnson Laboratories, Inc., Chicago, Ill., a corporation of Illinois Original No. 1,982,690, dated December 4, 1934, Serial No. 660,020, March 8, 1933, which is a division of Serial No. 388,289, August 26, 1929, now Patent No. 1,940,228, dated December 19, 1933. Application for reissue December 2, 1936, Serial No. 113,942. In Canada July 28, 1930

10 Claims. (Cl. 250—40)

The invention relates to the use of iron or other magnetic materials in radio-frequency and other alternating current circuits. More particularly, the present invention contemplates the use of such materials in tuned radio-frequency amplifying circuits, although the particular new instrumentalities to be described and claimed are not limited in their advantageous application to this particular class of apparatus.

This application is a division of my application on which Patent No. 1,940,228 has issued, covering certain new and useful improvements in radio amplifying circuits. This division reveals and claims certain new and useful improvements in transformers and inductance devices for use in selective resonant circuits.

As is well understood in the radio art, a tuned radio-frequency amplifying circuit consists essentially of a relay device such as a thermionic amplifying tube, and an electrically connected resonant circuit consisting of inductance and capacity. This resonant circuit is the portion of the radio-amplifying circuit in which the property of selectivity resides, and it may therefore be referred to as the selective circuit, as distinguished from the complete amplifying circuit including the tube or relay.

Hitherto, many attempts were made to employ iron cores in the transformers used in radio-frequency apparatus, but owing to great losses produced by the iron as then employed, efficiency was impaired, so that air-core coils and transformers are now exclusively used in the cases where relatively high-frequency oscillations, either modulated or not by voice frequencies, are to be selected and amplified by thermionic tubes and associated circuits.

The invention will be better understood if reference is made to the accompanying drawing wherein—

Figures 1, 2, 3 and 4, partly in section, show various modifications of the present invention;

Figure 7:
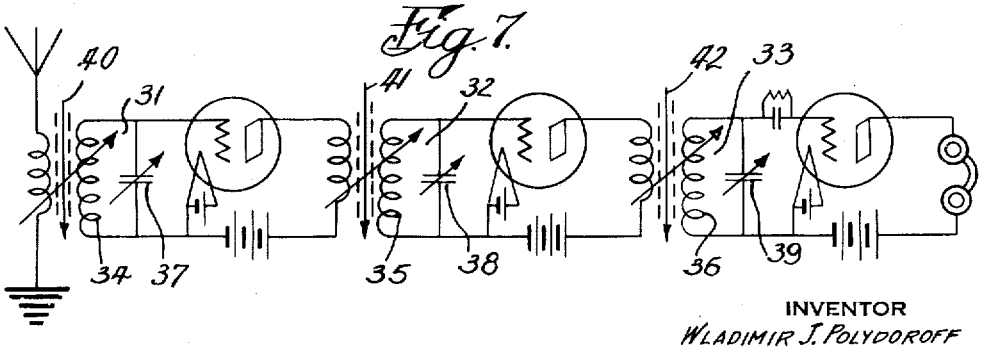
Figure 7 shows an application of the present invention in selective circuits.

It is usual practice to employ several stages of radio-frequency amplification in cascade, as shown on Figure 7, having variable inductances or capacities, or both, in the tuning circuits, so as to cover a certain band of frequencies, say from 1,500 to 550 kilocycles. Such a wide range of frequencies renders the amplifying circuits inefficient and different in operation at different frequencies.

It is amoung the objects of the present invention to improve fidelity, selectivity and efficiency and to secure uniformity of amplification.

Mathematical analysis (Victor G. Smith, Proc. I. R. E. vol. 15, No. 6, June 1927) shows that the amplification of tuned radio-frequency circuits is represented by the ration of output to input voltages:

$$\frac{V_o}{V_i}=1/2\frac{\mu}{\sqrt{R_1}}\cdot\frac{\omega L_2}{\sqrt{R_2}}$$

and $$M^2=\frac{Z_1Z_2}{\omega^2}$$

where $$\omega=2\pi f,$$

providing the circuit is tuned to resonance, and optimum coupling between primary and secondary circuits is obtained at each frequency. These formulae prove that with fixed inductance $L_2$, in order to keep the amplification constant, the resistance $R_2$ of the tuned circuit, which is chiefly composed of the coil's resistance, should change proportionately to the square of the frequency.

In the case of a fixed value of mutual inductance, M, the amplification decreases with increase of tuning capacity, when the mutual inductance is adjusted for the high-frequency end of the frequency band. Mutual inductance may be chosen to be at the optimum value somewhere in the middle of the frequency band. In this case, the circuits, being over-coupled at high frequency and under-coupled at low frequency, produce non-uniform amplification. The above formulae also prove that in order to keep the mutual inductance at its optimum value throughout the frequency band, the resistance $R_2$ should be so changed as still to be proportional to the square of the frequency.

Figure 5:
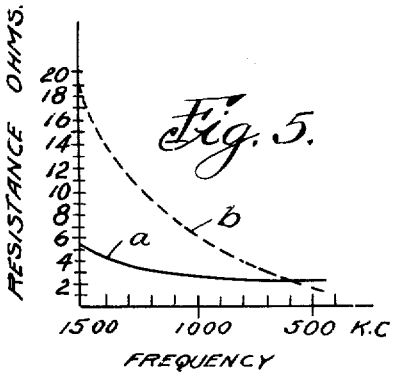
Figure 5 is a diagram showing the resistance variations of various coils.

Actual measurements of the resistance of an air coil or transformer show that the resistance changes with frequency, but not as much as would be required to keep the amplification constant and the mutual inductance at optimum. Curve *a* of Figure 5 shows the resistance for a certain air coil, measured at different frequencies, while curve *b* shows how the resistance would have to change if it were to remain proportional to the square of frequency. The attainment of this result is one of the objects of this invention.

It is evident that when the resistance of a coil varies in accordance with curve *b*, Figure 5, such a coil, in conjunction with a condenser, may form a parallel resonant circuit whose resonant impedance or dynamic resistance may be maintained constant when the circuit is turned by the condenser throughout a given range of frequencies. This dynamic resistance is usually expressed as $$R_d = \frac{L^2\omega^2}{R}$$

where L and R are the inductance and the resistance of the coil respectively, and $\omega$ is the angular velocity corresponding to the frequency. As $\omega$ is changed by tuning and R varies as the square of frequency, the resultant $R_d$ may be maintained constant.

In the measurements which form the basis of Figure 5, a low-loss coil was used, and its inductance was materially augmented by powdered iron disposed within the coil. The resistance as actually measured throughout the range of frequencies utilized is shown by the curve *b*, Figure 5. The curve indicates that the resistance changed approximately nine times while the frequency changed approximately three times. Numerous measurements have verified the fact that the resistance of a low-loss coil with a powdered-iron core may be made to vary substantially proportionally to the square of the frequency. Applicant's invention, therefore, comprehends, among other things, a circuit, which may be inductively related to a source of oscillations, containing a low-loss coil, a powdered-iron core and a tuning condenser, the condenser being used to vary the frequency of the circuit, and the core being employed to vary the resistance of the coil so as to maintain the dynamic resistance of the complete circuit substantially constant.

Figure 6:
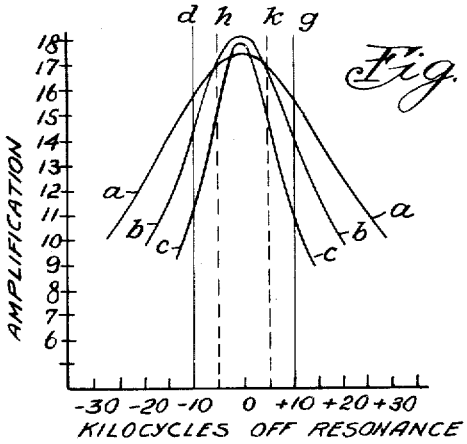
Figure 6 shows the selectivity curves of a selective circuit embodying one form of the present invention.

The curves of Figure 6 represent the selectivity obtained from a transformer, equipped with a fixed powdered-iron core as hereinbefore described.

The resistances of transformers having powdered-iron cores, being extremely small at 550 k. s. and the lower frequencies, it is possible to build transformers and coils designed for those low frequencies having an L/R ratio much greater than is possible in any practical design using air coils. Furthermore, when powdered-iron cores are used, it is possible to decrease the size of the windings and thereby minimize the size of the radio-frequency transformer itself, thus effectuating a saving of space.

Figure 1:
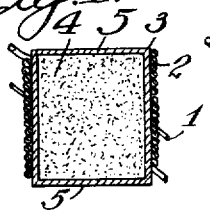

There may be several embodiments of my iron-core transformers and inductances, one embodiment being shown in Figure 1 wherein primary and secondary coils, 1, 2, are wound on an insulating tube 3, powdered iron 4 is packed inside the tube 3, and the ends 5 of the tube are sealed.

Figure 2:
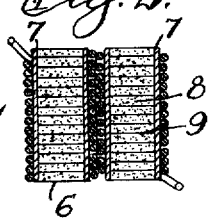

Figure 2 shows schematically a binocular coil 6 wound on insulating tubes 7, portions 8 of the powdered iron being separated by thin paper discs 9, to prevent readjustment of the particles and consequent packing, which would produce slight changes in inductance.

Iron cores can also be made by mixing various adhesive and insulating compounds with powdered iron, and giving these cores the desired shape with or without pressure. Also, certain other insulators, such as wax, paraffine and mineral oils, may be used. Substances when melted and mixed with iron particles, while hot manifest very small losses but, when cold and solidified, increase the conductivity of iron cores thousands of times and establish easy paths for eddy currents at high frequencies, resulting in a considerable increase in the radio-frequency resistance of coils equipped with such cores.

However, either a melted or an unmelted core of wax, without powdered iron, developed substantially no resistance in the coil, while, when powdered iron was mixed with the wax, the resistance due to the core was 5 ohms, if the wax was melted, and was 50 ohms, if the wax was solidified. Also, when the core comprised the same mass and quality of powdered iron alone, the resistance of the coil was 5 ohms.

Other insulators preferably of elastic nature, such as rubber, natural and synthetic gums and certain varnishes mixed with iron and pressed together, will maintain insulating films between the iron particles and, therefore, reduce resultant radio-frequency losses.

Figure 3:
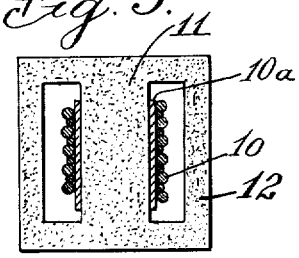

To obtain the maximum increase in inductance, due to the powdered-iron core, the length of the coil should be preferably about twice its diameter, and the wire should be space-wound. In the arrangement shown in Figure 3, 10 indicates a space-wound wire, and 11 indicates the powdered-iron core. A still further inductance increase will be secured if the iron core extends around the outside of the coil, as indicated by numeral 12. It will be noted that a space is left between winding 10 and the core extension 12, and that the turns of winding 10 are spaced from the core by an insulating sleeve 10*a*. Such an arrangement of the iron completely closes the magnetic lines around the coil, forming an elastic coil. When iron cores are employed in coils of the closed or semi-closed magnetic field type, the original astatic properties of such coils are greatly enhanced. If, for instance, the powdered-iron core doubles the individual primary and secondary inductances of a transformer, it may increase the mutual inductance between the windings four or five times. This phenomenon is especially advantageous when a very tight coupling is required, or when long solenoids are employed for transformation.

The word "iron" as used in this specification should be taken as including any other metal or alloy having magnetic properties, such for example, as silicon-iron, permalloy and nickel-iron. Various powdered metals have been tested for radio-frequency transformers and inductances. It has been found that for the most satisfactory results iron reduced by hydrogen, and having particles which have been sifted through a screen of 300 meshes to the inch, should be used for frequencies between 1500 and 1000 k. c. Coarser particles of magnetic material, however, may be used for frequencies below 1000 k. c. The fineness, and also the degree of compression, determine the radio-frequency resistance of the coil and core combination. Iron produced by hydrogen in the ordinary way contains particles of various sizes some of which may be too large for use in the production of cores suitable for use in radio-frequency circuits. It is, therefore, necessary to eliminate the largest particles.

There is usually present on the surfaces of iron particles an insulating coat of oxide and this helps to reduce the eddy-current losses. When silicon-iron powder is used, it is practical to chemically treat the powder with a phosphoric acid solution to create such an insulating film.

When, in this specification, the term "powdered iron" is used, it should be taken to mean either incoherent masses of finely divided iron, or masses of finely divided iron compressed into bodies in which the individual particles are held together by an insulating binder. The degree of compression, however, should not be so great as to cause the particles of powdered iron to touch each other and thus displace the insulating material which should separate them.

Figure 4:
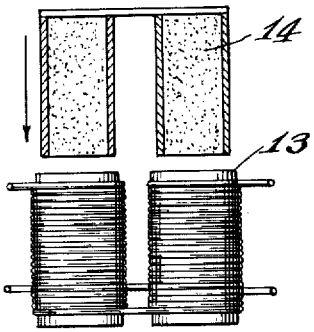

Another object of the present invention is to tune a radio-frequency circuit in a new, simple and efficient manner, a movable powdered-iron core disposed in the field of a coil being employed for tuning purposes. Depending on the amount of the iron powder inserted in the form of a core, the self-inductance of a coil may be increased four and even six times with a resulting increase in radio-frequency resistance. Figure 4 shows such a device in a form of binocular transformer 13, having a core 14 which can be moved in and out to obtain variations of self-inductance and mutual inductance.

When movable iron cores are used for tuning purposes in conjunction with other variable devices, such as variable condensers, variable inductances, variometers and the like, the movement of the iron core may be correlated with the movement of the other variable devices. It is preferable to so adjust the core that, at the higher frequencies, the iron is kept away from ths coil. As the frequency decreases, the iron core should be gradually inserted into the coil, with a constant or an increasing speed, depending on the design of the other tuning devices employed.

Figure 7 diagrammatically shows the invention embodied in a system for the reception of radio signals and the like. This system includes a plurality of selective resonant circuits 31, 32, 33, arranged in cascade with amplifying relay devices. Each circuit is provided with an inductance coil 34, 35 or 36, an external capacitance 37, 38 or 39, across the coil and a magnetic body 40, 41 or 42 disposed in the field of the coil and movable relatively to the coil, to thereby inductively affect more or less of its winding. If, as pointed out in my aforesaid Patent No. 1,940,228, the inductance and the radio-frequency resistance of each selective circuit are varied simultaneously and in the same proportion, then each circuit maintains its desired characteristics.

Having thus described my invention, what I claim is:

1. A closed-core high-frequency transformer for use in the high-frequency selective resonant circuits of radio broadcast receivers and the like operable over a range of high frequencies such as 550 to 1500 kilocycles, having in combination primary and secondary high-frequency windings, at least one of which is of low-loss character, and means for providing a relatively low-reluctance flux path for the high-frequency flux created by said low-loss winding comprising a compressed comminuted core member consisting mainly of insulated magnetic particles of sizes small enough to pass through a screen of 300 meshes to the inch and being so made as to have an inductance-increasing effect on said low-loss winding up to six in order to lower materially its resistance-increasing effect thereon at frequencies above 400 kilocycles; said low-loss winding being insulatedly arranged closely around and within said core member and being of materially lower self-inductance apart from said core member and of substantially smaller compass than comparable low-loss high-frequency air core coils having the same inductance value as that of said core member and said low-loss winding as arranged in combination, whereby at frequencies above 400 kilocycles and within the operating range, the increase in the effective inductance of said low-loss winding due to said core member is greater than the increase in the effective resistance of said low-loss winding due to said core member.

2. A high-frequency inductance device for use in the high-frequency selective resonant circuit of radio broadcast receivers and the like operable over a range of high frequencies such as 550 to 1500 kilocycles including in combination at least one low-loss high-frequency winding and means for providing a relatively low-reluctance flux path for the high-frequency flux created by said low-loss winding comprising a compressed comminuted ferromagnetic open core consisting mainly of insulated magnetic particles of sizes small enough to pass through a screen having 300 meshes to the inch and being so made as to have an inductance-increasing effect on said low-loss winding of the order of two in order to lower materially its resistance-increasing effect thereon at frequencies above 400 kilocycles; said low-loss winding being insulatedly arranged closely around said core and being of materially lower self-inductance apart from said core and of substantially smaller compass than comparable low-loss high-frequency air core coils having the same inductance value as that of said core and said low-loss winding as arranged in combination, whereby at frequencies above 400 kilocycles and within the operating range, the increase in the effective inductance of said low-loss winding due to said core is substantially greater than the increase in the effective resistance of said low-loss winding due to said core.

3. A high-frequency transformer for use in high-frequency selective resonant circuits of radio broadcast receivers and the like operable over a range of high frequencies such as 550 to 1500 kilocycles having in combination a plurality of insulated high-frequency windings, at least one of which is of low-loss character, and for providing a relatively low-reluctance flux path for the high-frequency flux created by said low-loss winding comprising a compressed comminuted ferromagnetic core body having insulated magnetic particles of metallic iron of sizes capable of passing through a screen having 300 meshes to the inch and being so made as to have an inductance-increasing effect on said low-loss winding of the order of two in order to lower materially its resistance-increasing effect thereon at frequencies above 400 kilocycles; said low-loss winding being insulatedly arranged closely around said core body and being of materially lower self-inductance apart from said core body and of substantially smaller compass than comparable low-loss high-frequency air core coils having the same inductance value as that of said core body and said low-loss winding as arranged in combination, whereby at frequencies above 400 kilocycles and within the operating range, the increase in the effective inductance of said low-loss winding due to said core body is substantially greater than the increase in the effective resistance of said low-loss winding due to said core body.

4. A high-frequency transformer for use in the high-frequency selective resonant circuits of radio broadcast receivers and the like operable over a range of high frequencies such as 550 to 1500 kilocycles having in combination a plurality of insulated high-frequency windings, at least one of which is of low-loss character, and means for providing a relatively low-reluctance flux path for the high-frequency flux created by said low-loss winding comprising a compressed comminuted ferromagnetic open core body having insulated magnetic particles and being so made as to have an inductance-increasing effect on said low-loss winding of the order of two in order to lower materially its resistance-increasing effect thereon at frequencies above 400 kilocycles; said low-loss winding being insulatedly arranged closely around said core body and being of materially lower self-inductance apart from said core body and of substantially smaller compass than comparable low-loss high-frequency air core coils having the same inductance value as that of said core body and said low-loss winding as arranged in combination, whereby at frequencies above 400 kilocycles and within the operating range, the increase in the effective inductance of said low-loss winding due to said core body is substantially greater than the increase in the effective resistance of said low-loss winding due to said core body.

5. A high-frequency inductance device for use in the high-frequency selective resonant circuits of radio broadcast receivers and the like operable over a range of high frequencies such as 550 to 1500 kilocycles, including in combination a low-loss high-frequency winding and means for providing a relatively low-reluctance flux path for the high-frequency flux created by said low-loss winding, comprising a compressed comminuted ferromagnetic open core body having insulated magnetic particles and being so made as to have an inductance-increasing effect on said low-loss winding of the order of two in order to lower materially its resistance-increasing effect thereon at frequencies above 400 kilocycles, said low-loss winding being insulatedly arranged closely around said core body and being of materially lower self-inductance apart from said core body and of substantially smaller compass than comparable low-loss high-frequency air core coils having the same inductance value as that of said core body and said low-loss winding as arranged in combination, whereby at frequencies above 400 kilocycles and within the operating range, the increase in the effective inductance of said low-loss winding due to said core body is substantially greater than the increase in the effecting resistance of said low-loss winding due to said core body.

6. A high-frequency inductance device for use in resonant circuits including at least one low-loss winding and a compressed comminuted magnetic core having insulated particles small enough to pass through a screen having 300 meshes to the inch, the increase in the effective inductance of said winding due to said core being substantially greater than the increase in the effective resistance of said winding due to said core.

7. A high-frequency inductance device for use in the high-frequency selective resonant circuits of radio broadcast receivers and the like operable over a range of high frequencies such as 550 to 1500 kilocycles including in combination at least one low-loss high-frequency winding and means of such form as to provide a substantially complete return flux path of relatively low-reluctance for the high-frequency flux created by said low-loss winding comprising a compressed comminuted ferromagnetic core having insulated magnetic particles of sizes small enough to pass through a screen having 300 meshes to the inch and being so made as to have an inductance-increasing effect on said low-loss winding up to six in order to minimize materially its resistance-increasing effect thereon at frequencies above 400 kilocycles; said low-loss winding being insulatedly arranged closely around and within said core and being of materially lower self-inductance apart from said core and of substantially smaller compass than comparable low-loss high-frequency air core coils having the same inductance value as that of said core and said low-loss winding as arranged in combination, whereby at frequencies above 400 kilocycles and within the operating range, the increase in the effective inductance of said low-loss winding due to said core is greater than the increase in the effective resistance of said low-loss winding due to said core.

8. A high-frequency inductance device for use in a high-frequency selective resonant circuit of a radio broadcast receiver or the like operable over a range of high frequencies such as 550 to 1500 kilocycles including in combination at least one low-loss high-frequency winding and means for providing a relatively low-reluctance flux path for the high-frequency flux created by said low-loss winding comprising a comminuted ferromagnetic core body, the particles of which have a natural insulating coat, and being so made as to have an inductance-increasing effect on said low-loss winding of the order of two in order to lower materially its resistance-increasing effect thereon at frequencies above 400 kilocycles; said low-loss winding being insulatedly arranged closely around said core body and being of materially lower self-inductance apart from said core body and of substantially smaller compass than comparable low-loss high-frequency air core coils having the same inductance value as that of said core body and said low-loss winding as arranged in combination, whereby at frequencies above 400 kilocycles and within the operating range, the increase in the effective inductance of said low-loss winding due to said core body is substantially greater than the increase in the effective resistance of said low-loss winding due to said core body.

9. A high-frequency inductance device for use in the high-frequency selective resonant circuits of radio broadcast receivers and the like operable over a range of high frequencies such as 550 to 1500 kilocycles, including in combination at least one low-loss high-frequency winding, and a compressed comminuted ferromagnetic core having insulated particles of sizes small enough to pass through a screen having 300 meshes to the inch and being so made as to have a small inductance-increasing effect on said low-loss winding in order to limit substantially its resistance-increasing effect thereon at frequencies above 400 kilocycles and within the operating range, said low-loss winding being of materially lower self-inductance apart from said core and of substantially smaller compass than comparable low-loss high-frequency air-core coils having the same inductance value as that of said core and said low-loss winding arranged in combination, whereby at frequencies above 400 kilocycles and within the operating range said winding and said core so coact that the increase in the effective inductance of said low-loss winding due to said core is substantially greater than the increase in the effective resistance of said winding due to said core.

10. A high-frequency inductance device for use in the high-frequency selective resonant circuits of radio broadcast receivers and the like operable over a range of high frequencies such as 550 to 1500 kilocycles, including in combination at least one low-loss high-frequency winding and means for providing a relatively low-reluctance flux path for the high-frequency flux created by said low-loss winding comprising a compressed comminuted ferromagnetic core body having insulated magnetic particles and being so made as to have an inductance-increasing effect on said low-loss winding up to six in order to limit substantially its resistance-increasing effect thereon at frequencies above 400 kilocycles and within the operating range, said low-loss winding being of materially lower self-inductance apart from said core and of substantially smaller compass than comparable low-loss high-frequency air-core coils having the same inductance value as that of said core and said low-loss winding arranged in combination, whereby at frequencies above 400 kilocycles and within the operating range said winding and said core so coact that the increase in the effective inductance of said low-loss winding due to said core is substantially greater than the increase in the effective resistance of said winding due to said core.

WLADIMIR J. POLYDOROFF.

CERTIFICATE OF CORRECTION.

Reissue No. 21,281. November 28, 1939.

WLADIMIR J. POLYDOROFF.

It is hereby certified that error appears in the printed specification of the above numbered patent requiring correction as follows: Page 1, second column, line 3, for "amoung" read among; page 2, first column, line 45, for "k. s." read k. c.; and second column, line 35, for "elastic" read astatic; page 3, second column, line 45, claim 3, after "and" insert means; page 4, first column, line 52, claim 5, for "effecting" read effective; and that the said Letters Patent should be read with this correction therein that the same may conform to the record of the case in the Patent Office.

Signed and sealed this 16th day of January, A. D. 1940.

Henry Van Arsdale,
Acting Commissioner of Patents.

(Seal)

DISCLAIMER

Re. 21,281.—*Wladimir J. Polydoroff*, Wilmette, Ill. SELECTIVE RADIO CIRCUIT. Patent dated Nov. 28, 1939. Disclaimer filed Jan. 29, 1946, by the assignee, *The Mantle Lamp Company of America.*

Hereby enters this disclaimer to claim 6 in said specification.

[*Official Gazette February 26, 1946.*]